United States Patent [19]

Santella et al.

[11] Patent Number: 5,525,779
[45] Date of Patent: Jun. 11, 1996

[54] INTERMETALLIC ALLOY WELDING WIRES AND METHOD FOR FABRICATING THE SAME

[75] Inventors: Michael L. Santella, Knoxville; Vinod K. Sikka, Oak Ridge, both of Tenn.

[73] Assignee: Martin Marietta Energy Systems, Inc., Oak Ridge, Tenn.

[21] Appl. No.: 71,911

[22] Filed: Jun. 3, 1993

[51] Int. Cl.$^6$ .................................................... B23K 9/23
[52] U.S. Cl. ............................ 219/137 WM; 219/146.22
[58] Field of Search ........................... 219/145.1, 145.23, 219/146.22, 137 WM

[56] References Cited

U.S. PATENT DOCUMENTS

| | | |
|---|---|---|
| 3,026,197 | 3/1962 | Schramm . |
| 4,711,761 | 12/1987 | Liu et al. . |
| 4,731,221 | 3/1988 | Liu . |
| 4,961,903 | 10/1990 | McKamey et al. . |
| 5,084,109 | 1/1992 | Sikka . |

FOREIGN PATENT DOCUMENTS 58-179596 10/1983 Japan .................................. 219/145.1

*Primary Examiner*—Clifford C. Shaw
*Attorney, Agent, or Firm*—E. Larcher; H. W. Adams

[57] ABSTRACT

Welding wires for welding together intermetallic alloys of nickel aluminides, nickel-iron aluminides, iron aluminides, or titanium aluminides, and preferably including additional alloying constituents are fabricated as two-component, clad structures in which one component contains the primary alloying constituent(s) except for aluminum and the other component contains the aluminum constituent. This two-component approach for fabricating the welding wire overcomes the difficulties associated with mechanically forming welding wires from intermetallic alloys which possess high strength and limited ductilities at elevated temperatures normally employed in conventional metal working processes. The composition of the clad welding wires is readily tailored so that the welding wire composition when melted will form an alloy defined by the weld deposit which substantially corresponds to the composition of the intermetallic alloy being joined.

26 Claims, 2 Drawing Sheets

INTERMETALLIC ALLOY WELDING WIRES AND METHOD FOR FABRICATING THE SAME

This invention was made with the support of the United States Government under contract No. DE-AC05-84OR21400 awarded by the U.S. Department of Energy. The United States Government has certain rights in this invention.

BACKGROUND OF THE INVENTION

The present invention relates generally to consumable welding wires or electrodes for the welding of intermetallic alloys such as nickel aluminides, nickel-iron aluminides, iron aluminides, and titanium aluminides and more particularly to the fabrication of such consumable wires which comprise a two-component, clad structure defined by a core and a sheath, one of which is formed of the primary intermetallic alloying constituent(s) except for the aluminum while the other is formed of the aluminum.

Intermetallic alloys such as provided by nickel aluminides, nickel-iron aluminides, iron aluminides, and titanium aluminides are being increasingly utilized in engineering structures in place of stainless steels and other metals or alloys these intermetallic alloys are less expensive and possess highly desirable mechanical properties at the elevated temperatures. Developments in these intermetallic alloys have resulted in significant improvements in the mechanical properties so as to even further increase their suitability for use in engineering structures. For example, in U.S. Pat. No. 4,711,761 to C. T. Liu et al, it was pointed out that the addition of boron (about 0.005–0.5 wt %) had been previously used in nickel aluminide alloys to reduce the brittleness of these alloys. This patent discloses that the strength of these boron-containing nickel-aluminide alloys, when incorporating about 9–11.5 wt % aluminum, is further improved by the additions of about 6–16 wt % iron which provides a desirable solid solution hardening effect. Also, in this patent it was disclosed that various combinations of other alloying constituents such as manganese (about 0.05–1.0 wt %), titanium (about 0.5 wt %), and niobium (about 1.3 wt %) are useful for increasing the fabricatability of these iron-containing nickel aluminides or nickel-iron aluminides. A further development in the evolution of nickel-aluminide and nickel-iron aluminide alloys is reported in U.S. Pat. No. 4,731,221 to C. T. Liu where chromium additions of about 1.5–8 at. % (about 1.4 to 7.9 wt %) provides for a substantial increase in the ductility of the nickel-aluminides and the nickel-iron aluminides at intermediate temperatures in the range of about 400° to 800° C. as well as improving creep oxidation resistance of such alloys. Also, the addition of about 0.2–1.5 at. % (about 0.3 to 5.0 wt %) of a Group IVB element, namely, hafnium, zirconium, or mixtures thereof in such alloys with or without the chromium addition provide an increase in high temperature strength. Cerium additions, like iron, was found to increase the ductility and the fabricability of these intermetallic alloys.

The mechanical and other properties of iron-aluminide alloys have also been significantly improved with early developments described in U.S. Pat. No. 3,026,197 to J. H. Schramm where the addition of zirconium and boron was employed to refine the grain structure in iron-aluminide alloys. A more recent improvement in these iron-aluminum alloys is described in U.S. Pat. No. 4,961,903 to C. G. McKamey et al where iron-aluminum alloys containing about 20 to 30 at. % (about 10.8 to 16.9 wt %) aluminum are provided with improved room temperature ductility, increased high temperature strength, and reduced susceptibility to corrosion by the additions of about 0.5 to 10 at. % (about 0.52 to 10.86 wt %) chromium, up to about 2.0 at. % (4.01 wt %) molybdenum, up to about 1.0 at. % (1.94 wt %) niobium, up to about 0.5 at. % (0.95 wt %) zirconium, 0.02 to about 0.3 at. % or 0.8 wt % boron, and/or carbon, up to 0.5 at. % (0.53 wt %) vanadium, and up to 0.1 at. % (0.18 wt %) yttrium. In U.S. Pat. No. 5,084,109 to V. K. Sikka et al, iron-aluminide alloys containing about 25 to 31 at. % (about 14 to 18 wt %) aluminum, and preferably including up to a total of about 12 at. % of an element or a combination of elements selected from chromium, niobium, zirconium, molybdenum, boron, and carbon is used to provide the intermetallic alloy with increased room temperature ductility and high temperature strength when the alloy is thermomechanically worked. Another recent development in the improvement of the mechanical properties of iron-aluminide alloys is described in commonly assigned U.S. patent application Ser. No. 07/904/802, filed Jun. 26, 1992, in the name of V. K. Sikka et al, where iron-aluminide alloys containing 8–9.5 wt % aluminum are provided with room temperature ductilities greater than 20%. The addition of an effective amount of chromium ranging from more than incidental impurities up to about 7 wt % was used to promote corrosion resistance of the alloy to aqueous solutions while the addition of about 4 wt % molybdenum was used to promote solution hardening as well as resistance of the alloy to corrosion in solutions containing chloride. A carbide former, preferably zirconium about 0.15–0.25 wt %, was combined with up to about 0.05 wt % carbon in the alloy for controlling grain growth in the iron-aluminide alloys at elevated temperatures.

Titanium aluminides provide relatively light-weight intermetallic alloys which possess high strength at elevated temperatures so as to render them particularly suitable for use in automotive, aeronautical and space applications. The titanium aluminides are usually of alpha ($Ti_3Al$) or gamma (TiAl) type alloys. Typical compositions for the $Ti_3Al$ alloy is a titanium base with about 22 to 35 at % aluminum, about 10 to 24 at % niobium for improving room temperature ductility of the alloy, about 3 at % vanadium, and about 0.5 to 1.0 at % molybdenum. The TiAl alloy typically comprises a titanium base with about 48 to 55 at % aluminum and about 2 to 4 at % of other alloying elements for improving room temperature ductility.

Previously known developments in nickel-aluminide alloys, nickel-iron aluminides, iron-aluminide, and titanium aluminide alloys such as generally described above and as disclosed in the aforementioned patents and the commonly assigned U.S. patent application, as well as in the publications and patents cited therein, provide these intermetallic alloys with highly desirable mechanical properties including high temperature strength, corrosion resistance, and good room temperature ductility. However, a significant drawback to the use of these intermetallic alloys in engineering applications which require the welding together of various structural components for forming engineering structures has not yet been satisfactorily addressed. The utilization of intermetallic alloys of the type described above in engineering structures is critically dependent upon the use of welding as a primary fabrication technique. This problem or drawback associated with the welding of intermetallic alloys is due to the difficulties encountered in processing the intermetallic alloys into consumable welding rods or wires by employing known metal working techniques usually practiced at elevated temperatures since these intermetallic alloys exhibit high temperature strength and limited ductility at such conventional metal working temperatures.

SUMMARY OF THE INVENTION

Accordingly, it is a principal aim or objective of the present invention to overcome the shortcoming or drawback found to be attendant with the formation or fabrication of consumable welding wires or rods of intermetallic alloys of nickel aluminide containing about 6–12 wt % Al, nickel-iron aluminides containing about 6–12 wt % Al and about 6–16 wt % Fe, iron aluminides containing about 8–18 wt % Al, and titanium aluminides containing about 10–55 at % Al, and with such alloys being with or without additional alloy constituents such as described above. In accordance with the present invention, a consumable welding wire for welding an intermetallic alloy comprising multiple alloying constituents including a base formed of aluminum together with nickel, nickel and iron, iron, or titanium as major alloying constituents is provided by forming the welding wire as a two-component structure with the first of the two parts or components being substantially formed of the alloy constituents except for the aluminum and the second of the two components being formed substantially of aluminum. This two-component structure is of a clad construction defined by an elongated core and a sheath substantially encasing the core. In one embodiment of the consumable welding wire, the elongated core is substantially formed of the alloy constituents except for the aluminum while the sheath substantially encasing the core is formed substantially of aluminum. In another embodiment of the consumable welding wire, the elongated core is substantially formed of the alloy constituents except for the nickel, nickel and iron, iron, or titanium, while the sheath substantially encasing the core is substantially formed of nickel or iron. The two-component welding wires of either embodiment has a concentration of alloying constituents substantially the same as the concentration of alloying constituents in the intermetallic alloy so that the weld joining together pieces of the intermetallic alloy is of an alloy composition substantially the same as the welded intermetallic alloy.

By excluding the aluminum from the intermetallic alloy composition, the formation of either the core or the sheath of the two-component or clad welding wire from the alloy constituents except for the aluminum can be readily achieved by employing conventional metal working techniques. The aluminum used for the core or sheath can also be readily formed by employing conventional metal working practices.

Inasmuch as the present invention is directed to consumable welding wires for welding intermetallic alloys of nickel aluminides, including those containing iron, and iron-aluminide alloys as generally previously known and particularly those described in the aforementioned patents and the commonly assigned U.S. patent application, these patents and this commonly owned patent application as well as the U.S. patents cited therein are specifically incorporated herein by reference.

Other and further objects of the present invention will become obvious upon an understanding of the illustrative embodiments and method about to be described or will be indicated in the appended claims, and various advantages not referred to herein will occur to one skilled in the art upon employment of the invention in practice. Also, the concentrations of the alloy constituents are in weight percent unless otherwise indicated.

Figure 1:
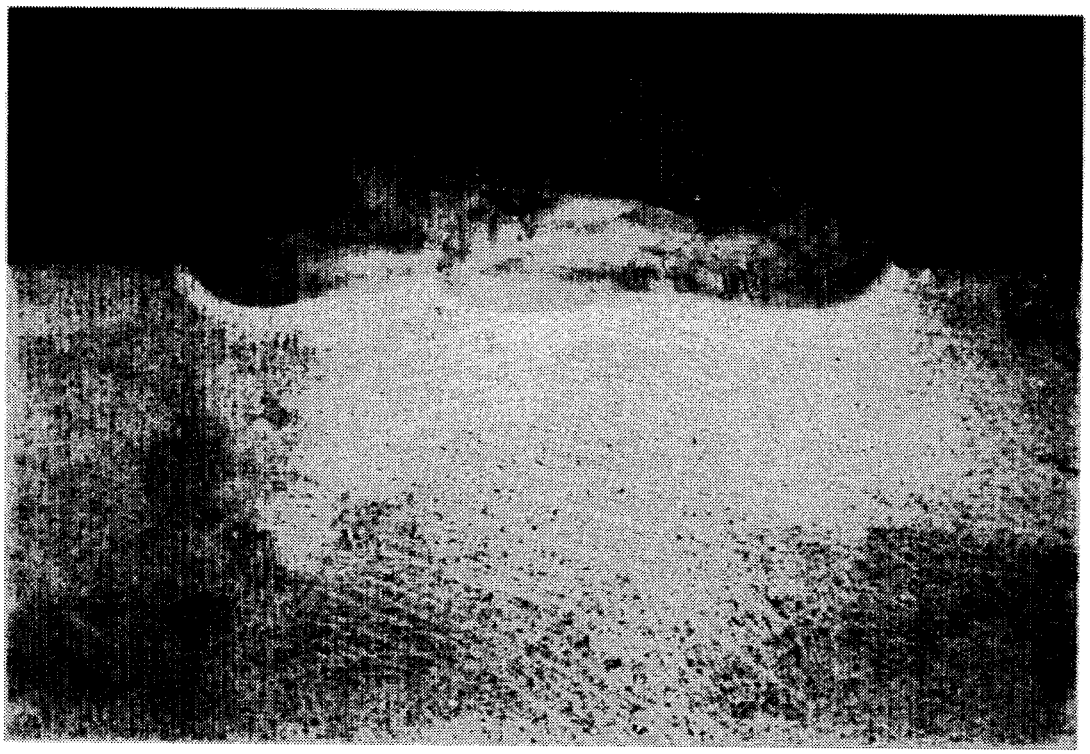
FIG. 1 is a photomicrograph of a weld deposit provided on a nickel-aluminide alloy by using a consumable welding wire of the present invention and which was formed of a nickel core with various other alloying constituents except for the aluminum and a sheath or cladding of pure aluminum.

Welds on a nickel-aluminide alloy and an iron-aluminum alloy of preferred alloy compositions have been chosen for the purpose of illustration and description. The use of these preferred alloy compositions in the clad welding wires for forming the welds illustrated are not intended to be exhaustive nor to limit the invention to the precise alloy compositions employed. For example, weld deposits on nickel-iron aluminides or titanium-aluminide components using the two-part welding wires of the present invention are expected to provide highly satisfactory welds with the weld metal having substantially the same composition as that of the titanium aluminides being welded. Also, the welds illustrated in the drawings are chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

As generally described above, the present invention is directed to welding consumables in the form of clad rods or wires and the method of making the same for welding intermetallic alloys in which the primary alloying constituents are in general: nickel and aluminum; nickel, iron and aluminum; iron and aluminum; and, titanium and aluminum, and more particularly such intermetallic alloys as described in the aforementioned patents and in the commonly assigned U.S. patent application.

In accordance with the present invention, consumable two-component welding rods or wires are prepared from alloy constituents which, when melted during the welding procedure, form a weld of an intermetallic alloy provided by alloying constituents which substantially match the alloying constituents of the intermetallic alloys being joined together so as to assure that the welds exhibit substantially the same mechanical and other properties as the intermetallic alloys joined by the weld. The fabrication of the present consumable welding wires are achieved without encountering the considerable problems previously suffered in forming consumable welding wires of the intermetallic alloy compositions by employing conventional metal working techniques practiced at elevated temperatures such as wire drawing, casting and rolling, extruding, and the like. It was found that the welding wires for welding together pieces of any of the aforementioned intermetallic alloys could be readily fabricated by using a two-component clad construction as defined in a preferred embodiment of the welding wire, by a core formed of the principal alloying constituents, namely nickel, nickel and iron, iron, or titanium and some or all of the other alloying constituents and encased within a sheath or cladding formed of the aluminum constituent with the balance or all of the other alloying constituents. These principal alloying constituents used to form the intermetallic alloys, namely, the nickel in the nickel-aluminide alloys, the nickel and iron in the nickel-iron aluminide alloys, the iron in the iron-aluminide alloys, and the titanium in the titanium-aluminide alloys can be readily drawn, or cast and rolled into the core-forming wire of a selected diameter by employing conventional metal working techniques when the aluminum constituent of the intermetallic alloy is not present. With the absence of the aluminum from the alloy composition used to form the core, the otherwise desirable high temperature and limited ductility properties of the intermetallic alloys are not present so as to obviate the difficulty heretofore encountered in mechanically working the intermetallic alloys at elevated temperatures.

After forming the core of the two-component welding wire of the primary alloying constituents except for the aluminum constituent, a sheath of the aluminum can be readily applied over the core by using a conventional metal working technique. For example, the sheath can be provided by wrapping strips of aluminum about the core, by extruding an aluminum sheath about the core, by passing the core and sheath through a die to form and position the sheath about the core, or by providing an aluminum coating on the core by passing the core through a bath of molten aluminum.

As the size of the core and the cladding can be independently varied, the composition of the weld deposit formed by the melting of the clad welding wire can be controlled within wide limits so that the alloy formed by the weld deposit can be closely matched with the intermetallic alloy being joined. Thus, during the welding operation, the clad welding wire is melted so that the core forming materials and the aluminum cladding flow together for forming an intermetallic alloy of a composition essentially corresponding to that of the intermetallic alloys being welded together. The combined diameter of the core wire and the thickness of the sheath is an overall diameter in the range of conventional welding wires so that conventional welding practices such as gas tungsten arc welding may be used for welding the intermetallic alloys. With the core of a diameter in a range of about 0.02 inch to 0.15 inch and a sheath with a wall thickness in the range of about 0.003 inch to 0.04 inch, the alloying constituents can be provided in a range of compositions suitable for forming intermetallic alloys such as in the aforementioned patents and the commonly assigned patent application.

While the preferred embodiment described above is primarily directed to forming the core from the primary alloy constituents except for the aluminum, it will appear clear that welding wires can be satisfactorily fabricated by using the reverse of this order. In this further preferred embodiment, the core contains the aluminum and is enclosed or clad within a sheath containing the nickel, nickel and iron, the iron, or the titanium. In this embodiment, a thin foil or tube of the nickel or the iron or a combination thereof or the titanium and with or without other alloying constituents may be wrapped or placed around a central core of the aluminum constituent with or without other alloying constituents.

It also is believed that a placement of an aluminum wire in a suitable side-by-side position with a wire of the nickel or iron or a combination thereof or the titanium such as provided by wrapping the wires together will provide a weld with the desired composition and properties of the intermetallic alloys being joined. For the purpose of this description, the two-component welding wire is intended to include such a side-by-side placement of an aluminum wire with a wire of nickel, nickel and iron, iron, or titanium.

In previously known intermetallic alloys of the type described above, especially those set forth in the aforementioned patents and in the commonly assigned U.S. patent application, as specifically incorporated herein by reference, various alloying constituents in addition to the primary constituents of the aluminum in combination with the nickel, the nickel and iron, the iron, or the titanium are used to enhance the mechanical properties such as high-temperature strength, room-temperature ductility, as well as promoting various desirable features such as increased corrosion resistance and the like. These supplemental alloying constituents can be readily incorporated in the clad welding wires of the present invention by practicing any of several approaches such as: incorporating all of the alloy constituents except for only the aluminum with the nickel, the nickel and iron, the iron, or the titanium in the core or the sheath; forming a core or sheath of the aluminum and other alloy constituents except for the nickel, nickel and iron, the iron, or the titanium; or, incorporating some of the supplemental alloying constituents with the aluminum welding wire component and the balance of the alloying constituents with the nickel, the nickel and iron, the iron, or the titanium welding wire component. It is believed that any of these approaches will provide for the fabrication of satisfactory welding wires for intermetallic alloys since the supplemental alloying constituents do not prevent the aluminum or the nickel, the nickel and iron, the iron, or the titanium from being mechanically formed into the core or sheath in a manner significantly easier than heretofore encountered during the mechanically forming of the intermetallic alloys into consumable welding wires. Of course, during the formation of such welding wires, the alloying constituents are selected to form a weld deposit of an intermetallic alloy of a composition which closely matches or corresponds to that of the intermetallic alloys being welded.

In order to provide a more facile understanding of the present invention, examples of welding a nickel-aluminide alloy and an iron-aluminide alloy by using consumable welding wires produced in accordance with the present invention are set forth below. It will appear clear that the composition of the welding wires on compositions of the intermetallic alloys welded by these wires as described in these examples are merely exemplary with these particular intermetallic alloys and welding wires being used to demonstrate the tailoring of the welding wires so as to provide welds formed of alloys closely matching the intermetallic alloys being welded together.

EXAMPLE 1

A two-component (core and sheath) consumable wire for welding a nickel aluminide alloy ($Ni_3Al$) with a composition of 8%Al-7.7%Cr-3%Zr-1.5%Mo-0.003%B (wt %) and the balance nickel was prepared. A nickel alloy with composition of Ni-8.4%Cr-3.3%Zr-1.6%Mo-0.003%B (wt %) was produced by conventional laboratory melting techniques and cast into a 0.25-in-diameter core-forming rod. The cast nickel alloy rod was cold rolled into 0.045-in-diameter wire using successive reductions of 20–30% with intermediate annealing at 1100° C. No cracks were evident in the rolled wire. As compared to the working of a Ni₃Al alloy, the Ni alloy wire was relatively easy to process and that even larger cold reductions are believed to be useable. The composition of this nickel alloy was chosen so that when mixed with the appropriate amount of aluminum, a weld of Ni₃Al alloy having a composition closely matching that of the Ni₃Al alloy being welded would be produced.

A mass balance calculation indicated that an aluminum sheath of a thickness of 0.005 inch would be required over the nickel alloy wire to produce the desired Ni₃Al composition. A piece of an essentially pure aluminum ingot was cold rolled into a sheet of the required thickness and then cut into 0.5 inch wide strips. These aluminum strips were then successively wrapped around the nickel alloy wire to produce the two-component or clad welding wire of a sufficient length to form the weld deposit shown in FIG. 1.

This weld deposit was provided by forming three weld beads on a casting of the above Ni₃Al alloy using a conventional gas tungsten arc (GTA) welding process. No welding problems were encountered, and the appearance of the weld deposit was excellent with no indication of cracking. A 5× magnification of this weld is shown in FIG. 1. A metallographical examination of this weld deposit included a comparison of the hardness of the weld deposit with the Ni₃Al casting. This hardness measurement was provided by using a Vickers indenter with a 1 kg load. The average hardness of the weld deposit was 355.5 DPH which favorably compared to the 345.6 DPH hardness of the Ni₃Al casting, indicating that good mechanical properties are maintained in the weld.

Figure 2:
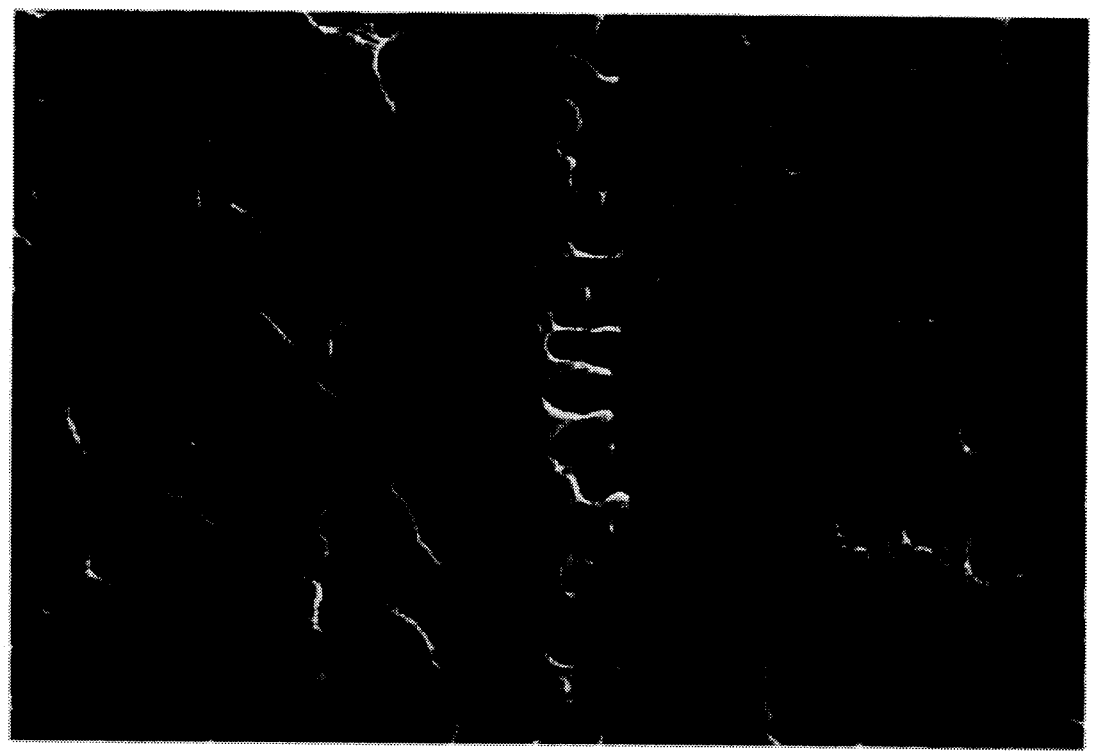
FIG. 2 is photomicrograph through a scanning electron microscope for showing details of the microstructure of the FIG. 1 weld deposit.

In an examination of weld deposit by a scanning electron microscope, the microstructure of the weld deposit, as shown in FIG. 2, indicated that elemental segregation in the weld deposit was generally consistent with that observed in weld deposits made with one piece welding wires formed of the entire Ni₃Al alloy, although aluminum segregation appeared to be more pronounced. However, no free aluminum was found, and there are no features in the weld microstructure which would suggest that the mechanical properties required of weld alloy would be compromised. The overall composition of the weld deposit was determined to be 7.73%Al-7.90%Cr-1.89%Zr-1.21%Mo (wt %), and the balance nickel closely matched the target composition of the Ni₃Al alloy being welded.

EXAMPLE 2

In this example a two-component welding wire was fabricated for welding an iron-aluminum alloy having a composition (wt %) of 16% Al-5.5%Cr-1.5% Mo-0.08%C-0.8%Zr and the balance iron. The core of the welding wire was formed from an iron alloy casting of 8.5% Al-5.5%Cr-1.5%Mo-0/08%C-0.8%Zr (wt %) and the balance iron. The casting was cold rolled into 0.125 inch diameter wire using successive reductions of 10–30% with intermediate annealing at 1000° C. Compared to an iron-aluminum alloy of the aforementioned composition, the iron alloy wire was easy to process with larger cold reductions being possible and there was no cracking evident in the rolled wire.

A mass balance calculation was used to estimate that the aluminum sheath would need to be of a thickness of about 0.007 inch to produce a welding wire including the alloying constituents of the core which will provide a weld deposit of iron-aluminum alloy of a composition closely matching that of the iron-aluminum alloy being welded. This aluminum sheath was prepared in the manner described in Example 1.

Figure 3:
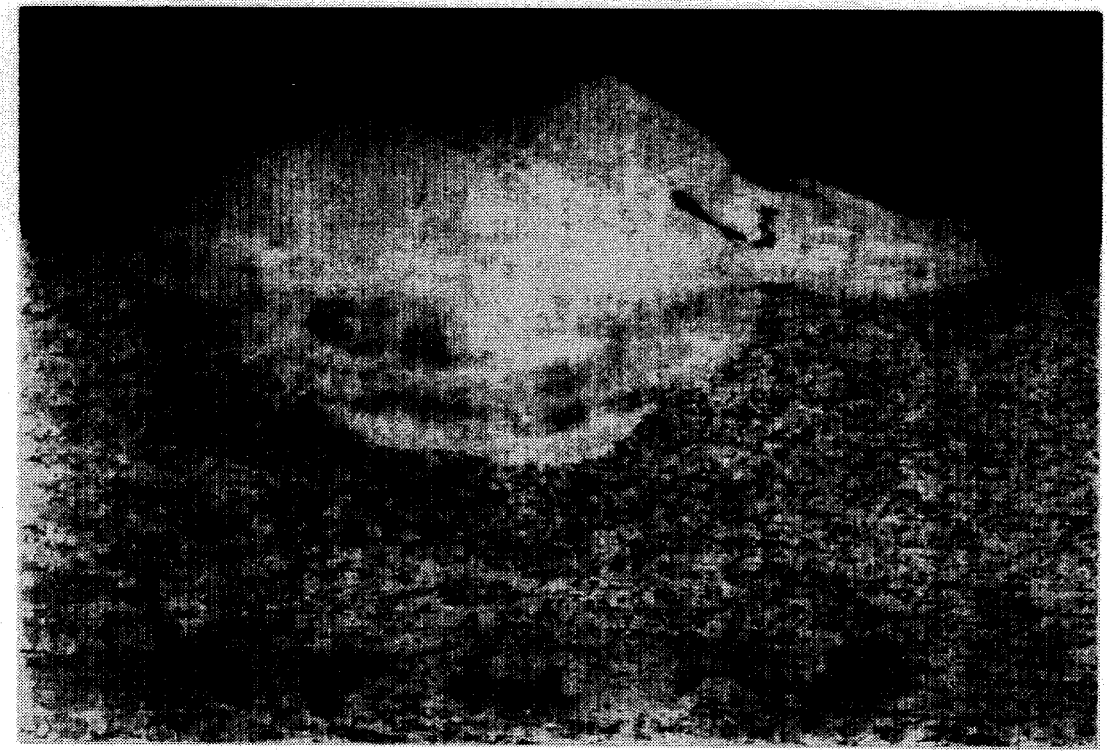
FIG. 3 is a photomicrograph of a weld deposit provided on an iron-aluminum alloy in which the weld deposit was provided by a clad welding wire of the present invention in which the core is formed of the iron and other alloy constituents except for aluminum and the sheath or cladding is formed of pure aluminum.

A three-bead weld deposit was made on a casting of the iron-aluminum alloy using a conventional gas tungsten arc welding process with no problems being encountered with the wire during welding, and with the weld deposit appearance being excellent with no indication of cracking. A 7× magnification view of a cross-section of this weld deposit is shown in FIG. 3. The hardness of the casting and the weld deposit was measured with a Vickers indenter using a 0.5 kg load with average hardness of the weld deposit being 300 DPH and that of the iron-aluminum alloy casting being 294 DPH so as to indicate that good mechanical properties are maintained in the weld.

Figure 4:
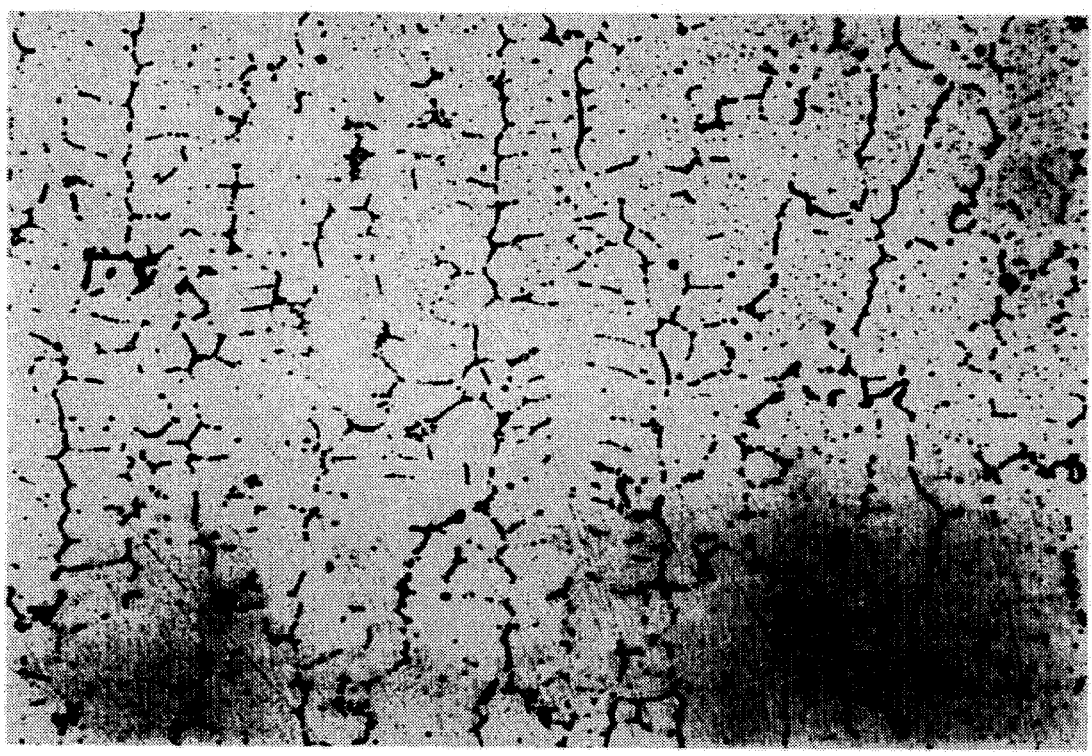
FIG. 4 is a photomicrograph using a scanning electron microscope for showing details of the microstructure of the FIG. 3 weld deposit.

The microstructure of the iron-aluminide weld deposit is illustrated in FIG. 4 at a 400× magnification. There was no evidence of pronounced aluminum segregation in the weld deposit. Also, the micro-segregation pattern and grain structure of this weld deposit is generally consistent with such properties observed in weld deposits made with single-component wire formed entirely of the iron-aluminide alloy. The overall composition of the weld deposit made with the two-part welding wire, as determined by microchemical analysis in a scanning electron microscope, was 80.0% Fe-12.6%Al-5.3%Cr-2.1%Mo. The composition of the base alloy as determined by the same technique was 80.7% Fed 1.9% Al-5.7%Cr-1.5%Mo. These test results indicate that control of the weld deposit composition using the two-part welding wire is excellent for iron-aluminide alloys.

It will be seen that the present invention provides a significant development for enhancing the utilization of intermetallic alloys in engineering structures since the fabrication of consumable welding wires in accordance with the present invention obviates a major drawback in the use of intermetallic alloys in engineering structures requiring welding. The present invention overcomes the difficulties associated with processing intermetallic alloys into welding wires since the two-component clad wire approach of the present invention permits relatively easy processing and a tailoring of the clad welding wires for producing weld deposits of alloy compositions closely matching those of the intermetallic alloys being joined together.

What is claimed is:

1. A consumable welding wire formed of multiple alloying constituents essentially corresponding to the composition of an intermetallic alloy weldable thereby and selected from the group of intermetallic alloys consisting of a nickel-aluminide alloy formed of multiple alloying constituents with major alloying constituents consisting of nickel and aluminum, a nickel-iron-aluminide alloy formed of multiple alloying constituents with major alloying constituents consisting of nickel, iron and aluminum, an iron-aluminum alloy formed of multiple alloying constituents with major alloying constituents consisting of iron an aluminum, and a titanium-aluminide alloy formed of multiple alloying constituents with major alloying constituents consisting of titanium and aluminum, said welding wire consisting essentially of a two component structure defined by an elongated core and a sheath substantially encompassing the core and with the first component of the two component structure being substantially formed of multiple alloy constituents essentially corresponding to multiple constituents of said intermetallic alloy except for the aluminum and with the second component of the two component structure being formed substantially of aluminum.

2. A consumable welding wire as claimed in claim 1, wherein the elongated core is substantially formed of the multiple alloy constituents except for the aluminum, and wherein the sheath substantially encompassing said core is formed substantially of aluminum.

3. A consumable welding wire as claimed in claim 1, wherein the elongated core is formed substantially of aluminum, and wherein the sheath substantially encompassing said core is formed substantially of nickel, nickel and iron, iron, or titanium.

4. A consumable welding wire as claimed in claim 1, wherein the intermetallic alloy is the nickel-aluminide alloy, wherein aluminum in the nickel-aluminide alloy is in a concentration of about 6 to 12 wt %, and wherein the concentration of the aluminum alloying constituent in the second component in the two-component structure defining the welding wire is in an aluminum-to-nickel ratio adequate to provide a weld of the intermetallic alloy with an aluminum concentration substantially corresponding to the about 6 to 12 wt % aluminum in the nickel-aluminide alloy.

5. A consumable welding wire as claimed in claim 4, wherein the nickel-aluminide alloy includes a sufficient concentration of a Group IVB element or mixtures thereof to increase high temperature strength of the alloy, and wherein a Group IVB element or a mixture of Group IVB elements is combined with the nickel in the first component of the two-component of the two-component structure or with the aluminum in the second component of the two-component structure in a concentration adequate to provide the weld of the nickel-aluminide alloy with high temperature strength essentially corresponding to the high temperature strength of the nickel-aluminide alloy.

6. A consumable welding wire as claimed in claim 5, wherein the nickel-aluminide alloy includes an effective amount of chromium sufficient to increase ductility of the alloy at elevated temperatures in an oxidizing atmosphere or promote resistance of the alloy to aqueous corrosion, and wherein chromium is combined with the nickel in the first component of the two-component of the two-component structure or with the aluminum in the second component of the two-component structure in a concentration adequate to provide the weld of the nickel-aluminide alloy with ductility at elevated temperatures in an oxidizing atmosphere or corrosion resistance essentially corresponding to the ductility and corrosion resistance of the nickel-aluminide alloy.

7. A consumable welding wire as claimed in claim 6, wherein the nickel-aluminide alloy includes molybdenum in a concentration of up to about 3.0 wt % and boron in a sufficient concentration to increase room temperature ductility of the alloy, and wherein molybdenum and boron are combined with the nickel in the first component of the two-component of the two-component structure or with the aluminum in the second component of the two-component structure in concentrations adequate to respectively provide the weld with 0 to about 3 wt % molybdenum and with room temperature ductility essentially corresponding to the room temperature ductility of the nickel-aluminide alloy.

8. A consumable welding wire as claimed in claim 1, wherein the intermetallic alloy is the nickel-iron aluminide alloy, wherein the aluminum in the nickel-iron-aluminide alloy is in a concentration in the range of about 9 to 11.5 wt %, wherein the nickel-iron-aluminide alloy contains iron in concentration in the range of about 6 to16 wt % and in an amount effective to strengthen the nickel-aluminide alloy by solid solution hardening, and wherein iron is combined with the nickel in the first component of the two-component of the two-component structure or with the aluminum in the second component of the two-component structure in a concentration adequate to provide the weld of the nickel-iron-aluminide alloy with strength by solid solution hardening essentially corresponding to strength by solid solution hardening of the nickel-iron-aluminide alloy.

9. A consumable welding wire as claimed in claim 1, wherein the intermetallic alloy is the iron-aluminum alloy, wherein the aluminum in the iron-aluminum alloy is in a concentration in the range of about 8 to 18 wt %, and wherein the concentration of the aluminum in the second component of the two-component structure is in an aluminum-to-nickel ratio adequate to provide a weld of the iron-aluminum alloy with an aluminum concentration substantially corresponding to the about 8 to 18 wt % aluminum in the iron-aluminum alloy.

10. A consumable welding wire as claimed in claim 9, wherein the iron-aluminum alloy includes an effective amount of chromium in the range of more than incidental impurities up to about 7 wt % to promote resistance to corrosion in aqueous solutions, and wherein chromium is incorporated in the first or second component of the two-component structure in a concentration adequate to provide a weld of the iron-aluminum alloy with a chromium concentration substantially corresponding to the chromium concentration of the alloy.

11. A consumable welding wire as claimed in claim 1, wherein the intermetallic alloy is the titanium-aluminide alloy, wherein the concentration of aluminum in the titanium-aluminide alloy is in the range of about 22 to 55 at %, and wherein the aluminum in the second component of the two-component structure is in an aluminum-to-titanium ratio adequate to provide a weld of the titanium-aluminide alloy with an aluminum concentration substantially corresponding to the about 22 to 55 at % aluminum in the titanium aluminide alloy.

12. A method for for welding an intermetallic alloy selected from the group of intermetallic alloys consisting of a nickel-aluminide alloy formed of multiple allowing constituents with major alloying constituents consisting of nickel and aluminum, a nickel-iron-aluminide alloy formed of multiple alloying constituents with major alloying constituents consisting, of nickel, iron and aluminum, an iron-aluminum alloy formed of multiple alloying constituents with major alloying constituents consisting of iron an aluminum, and a titanium-aluminide alloy formed of multiple alloying constituents with major alloying constituents consisting of titanium and aluminum, by welding the intermetallic with a welding wire by the steps consisting essentially of: fabricating the welding wire by forming an elongated two-component structure with the first component of the two component structure being formed substantially of the major alloying constituents of the intermetallic alloy selected from said group except for the aluminum alloying constituent of said intermetallic alloy; forming the second component of said two component structure substantially of aluminum, said two-component structure having a concentration of alloying constituents substantially corresponding to the concentration of the alloying constituents in the intermetallic alloy for forming a weld of an alloy composition essentially the same as the composition of the intermetallic alloy to be welded by the welding wire; encasing a core formed of one of said first or second components in a sheath formed of the other of said first or second components for forming the welding wire; and, thereafter forming said weld by welding the intermetallic alloy with said welding wire.

13. A method for welding an intermetallic alloy as claimed in claim 12, wherein the core is formed substantially of alloying constituents essentially corresponding to the alloy constituents of said intermetallic alloy excluding the aluminum, and wherein the sheath is formed substantially of the aluminum corresponding to the aluminum constituent of the intermetallic alloy.

14. The method for welding an intermetallic alloy as claimed in claim 13, wherein the step of encasing the core formed of the major alloying constituents corresponding to those of the intermetallic alloy except for the substantially aluminum constituent of the intermetallic alloy in the sheath formed of the substantially aluminum constituent consists of forming an elongated strip of substantially the aluminum and wrapping the resulting strip about the core.

15. The method for welding an intermetallic alloy as claimed in claim 13, wherein the step of encasing the core formed of the major alloying constituents corresponding to those of the intermetallic alloy except for the substantially aluminum constituent of the intermetallic alloy in the sheath formed of the substantially aluminum constituent consists of forming a molten pool of substantially the aluminum and thereafter passing the core through the molten pool for coating the core with a layer of substantially the aluminum for forming said sheath.

16. A method for welding an intermetallic alloy as claimed in claim 12, wherein the core is formed substantially aluminum, and wherein the sheath is substantially formed of the constituents of said intermetallic alloy excluding the aluminum.

17. The method for welding an intermetallic alloy as claimed in claim 16, wherein the step of encasing the core of substantially aluminum in the sheath of the major alloying constituents corresponding to those of the intermetallic alloy except for the aluminum comprises enclosing the core in a tube defining the sheath.

18. The method for welding an intermetallic alloy as claimed in claim 12, wherein the intermetallic alloy is the nickel-aluminide alloy, and wherein the concentration of aluminum in the nickel-aluminide alloy is in the range of about 6 to 12 wt %.

19. The method for welding an intermetallic alloy as claimed in claim 18, wherein the nickel-aluminide alloy includes a sufficient concentration of a Group IVB element or mixtures thereof to increase high temperature strength of the alloy, and including the additional step of combining a Group IVB element or a mixture of Group IVB elements with the nickel in the first component or with the aluminum in the second component of the two-component structure in a concentration adequate to provide the alloy forming the weld with high temperature strength substantially corresponding to that of the nickel-aluminide alloy welded by the welding wire.

20. The method for welding an intermetallic alloy as claimed in claim 19, wherein the nickel-aluminide alloy includes an effective amount of chromium sufficient to increase ductility of the alloy at elevated temperatures in an oxidizing atmosphere or promote resistance of the alloy to aqueous corrosion, and including the additional step of combining chromium with the nickel in the first component or with the aluminum in the second of the two-component structure in a concentration adequate to provide the alloy forming the weld with ductility at elevated temperatures in an oxidizing atmosphere or corrosion resistance substantially corresponding to that of the nickel-aluminide alloy welded by the welding wire.

21. The method for welding an intermetallic alloy as claimed in claim 20, wherein the nickel-aluminide alloy includes molybdenum in a concentration up to about 3.0 wt % and boron in a sufficient concentration to increase ductility of the alloy, and including the additional step of combining molybdenum and boron with the nickel in the first component or with the aluminum in the second component of the two-component structure in concentrations adequate to respectively provide the alloy forming the weld with up to about 3.0 wt % molybdenum and in an amount corresponding to that in the nickel-aluminide alloy and with a level of ductility substantially corresponding to the ductility of the nickel-aluminide alloy.

22. The method for welding an intermetallic alloy as claimed in claim 18, wherein the intermetallic alloy is nickel-iron-aluminide alloy wherein the concentration of aluminum in the nickel-iron-aluminide alloy is in the range of about 9 to 11.5 wt %, wherein the nickel-iron-aluminide alloy contains an amount of iron sufficient to effect strengthening of the nickel-iron-aluminide alloy by solid solution hardening, and including the additional step of combining iron with the nickel in the first component or with the aluminum in the second component of the two-component structure in a concentration adequate to provide the alloy forming the weld with a iron concentration essentially the same as in the nickel-iron-aluminide alloy.

23. The method for for welding an intermetallic alloy as claimed in claim 22, wherein the iron in the nickel-iron-aluminide alloy is in a concentration of about 6 to 16 wt %, wherein the nickel-iron-aluminide alloy is doped with about 0.003 to 0.07 wt % boron, and including the additional step of combining boron with the nickel in the first component or with the aluminum in the second component of the two-component structure in a sufficient concentration to provide the alloy forming the weld with a concentration of boron essentially the same as in the nickel-iron-aluminide alloy.

24. The method for welding an intermetallic alloy as claimed in claim 12, wherein the intermetallic alloy is the iron-aluminum alloy, wherein the aluminum concentration in the iron-aluminum alloy is in the range of about 8 to 30 wt %, and wherein the aluminum in the two-component structure is in an aluminum-to-nickel ratio adequate to provide the alloy forming the weld with an aluminum concentration essentially corresponding to the aluminum concentration in the iron-aluminum alloy.

25. The method for welding an intermetallic alloy as claimed in claim 24, wherein the iron-aluminum alloy includes an effective amount of chromium in the range of more than incidental impurities up to about 7 wt % to promote resistance to corrosion in aqueous solutions, and including the additional step of combining chromium with the iron in the first component or with the aluminum in the second component of the two-component structure in a sufficient concentration for providing the alloy forming the weld with a concentration of chromium essentially corresponding to the chromium concentration in the iron-aluminum alloy.

26. The method for welding an intermetallic alloy as claimed in claim 12, wherein the intermetallic alloy is titanium-aluminide, wherein the concentration of aluminum in the titanium-aluminide alloy is in the range of about 22 to 55 at %, and wherein the aluminum in the second component of the two-component structure is in an aluminum-to-titanium ratio adequate to provide the alloy forming the weld with an aluminum concentration essentially corresponding to the aluminum concentration in the titanium-aluminide alloy.

\* \* \* \* \*